US011052462B2

(12) United States Patent
Giulietti et al.

(10) Patent No.: US 11,052,462 B2
(45) Date of Patent: Jul. 6, 2021

(54) EMBEDDED ELECTRONICS IN METAL ADDITIVE MANUFACTURING BUILDS ENABLED BY LOW-MELTING TEMPERATURE TRANSITION ZONE USING MATERIAL GRADIENTS

(71) Applicant: HAMILTON SUNDSTRAND CORPORATION, Charlotte, NC (US)

(72) Inventors: Diana Giulietti, Bloomfield, CT (US); Alexander Madinger, Hartford, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 48 days.

(21) Appl. No.: 15/961,491

(22) Filed: Apr. 24, 2018

(65) Prior Publication Data
US 2019/0321885 A1    Oct. 24, 2019

(51) Int. Cl.
| | |
|---|---|
| *B22F 10/20* | (2021.01) |
| *B33Y 10/00* | (2015.01) |
| *B33Y 80/00* | (2015.01) |
| *B33Y 70/00* | (2020.01) |

(52) U.S. Cl.
CPC ............ *B22F 10/20* (2021.01); *B33Y 10/00* (2014.12); *B33Y 80/00* (2014.12); *B22F 2301/00* (2013.01); *B22F 2301/052* (2013.01); *B33Y 70/00* (2014.12)

(58) Field of Classification Search
CPC ...... B22F 3/1055; B22F 7/08; B22F 2207/01; B22F 2301/00; B22F 2301/052; B33Y 10/00; B33Y 80/00; B33Y 70/00
See application file for complete search history.

(56) References Cited

U.S. PATENT DOCUMENTS

| | | | |
|---|---|---|---|
| 9,414,501 B2 | 8/2016 | Wicker et al. | |
| 9,431,330 B2 | 8/2016 | Karlen et al. | |
| 2013/0075575 A1* | 3/2013 | Abe | B29C 35/0272 249/78 |
| 2015/0044084 A1* | 2/2015 | Hofmann | C22C 38/08 419/7 |
| 2017/0075575 A1 | 3/2017 | Hsiao | |
| 2017/0286821 A1 | 10/2017 | Nardi et al. | |

FOREIGN PATENT DOCUMENTS

CN    107159885 A    9/2017

OTHER PUBLICATIONS

European Search Report Issued in European Application No. 19170590.4 dated Sep. 17, 2019; 6 Pages.
Mathew et al.; "Integrating Fibre Fabry-Perot Cavity Sensor in to 3D Printed Metal Components for Extreme High Temperature Monitoring Applications"; IEEE Sensors Journal; vol. 17, No. 13; Jul. 1, 2017; 8 Pages.

* cited by examiner

*Primary Examiner* — Frank J Vineis
*Assistant Examiner* — Laura B Figg
(74) *Attorney, Agent, or Firm* — Cantor Colburn LLP

(57) ABSTRACT

An additive manufacturing product is provided. The additive manufacturing product includes an embedded electronic, a transition zone, and a base material. The transition zone encases the embedded electronic. The transition zone includes transition material. The base material encases the transition zone. The transition material includes an intermediate melting point that is lower than a melting point of the base material.

9 Claims, 7 Drawing Sheets

EMBEDDED ELECTRONICS IN METAL ADDITIVE MANUFACTURING BUILDS ENABLED BY LOW-MELTING TEMPERATURE TRANSITION ZONE USING MATERIAL GRADIENTS

BACKGROUND

Embedded electronics, made by plastic additive manufacturing, has come into use for industries like prognostic health monitoring and feedback controls. However, metal parts cannot benefit from embedded electronics due to the high processing temperatures needed to implant the embedded electronics into the metal parts, as the high processing temperatures destroy circuitry of the embedded electronics.

BRIEF DESCRIPTION

In accordance with one or more embodiments, an additive manufacturing product is provided. The additive manufacturing product includes an embedded electronic, a transition zone, and a base material. The transition zone encases the embedded electronic. The transition zone includes transition material. The base material encases the transition zone. The transition material includes an intermediate melting point that is lower than a melting point of the base material.

In accordance with one or more embodiments or the additive manufacturing product embodiment above, the intermediate melting point can enable the transition zone material to be compatible with the embedded electronics and can enable the transition zone material to bond with the metal material.

In accordance with one or more embodiments or any of the additive manufacturing product embodiments above, the base material can comprise a metal material.

In accordance with one or more embodiments or any of the additive manufacturing product embodiments above, the transition material can be a discrete deposit between the embedded electronic and the base material that contemporaneously forms the transition zone.

In accordance with one or more embodiments or any of the additive manufacturing product embodiments above, the transition material can be a material gradient that starts with transition zone material near the embedded electronics and incrementally includes more of the base material as the transition zone moves away from the embedded electronics and towards the base material.

In accordance with one or more embodiments or any of the additive manufacturing product embodiments above, the transition zone can comprise a plurality of columns constructed in one or more layers.

In accordance with one or more embodiments or any of the additive manufacturing product embodiments above, the transition zone can comprise a plurality of stacked wreaths constructed in one or more layers.

In accordance with one or more embodiments or any of the additive manufacturing product embodiments above, the transition zone can comprise a plurality of projecting columns constructed in one or more layers.

In accordance with one or more embodiments, a method of additive manufacturing is provided. The method includes depositing a transition material form a transition zone encasing an embedded electronic. The transition material includes an intermediate melting point that is lower than a melting point of the base material. The method includes depositing a base material encasing the embedded electronic.

In accordance with one or more embodiments or the method of additive manufacturing above, the intermediate melting point can enable the transition zone material to be compatible with the embedded electronics and can enable the transition zone material to bond with the metal material.

In accordance with one or more embodiments or any of the method of additive manufacturing embodiments above, the base material can comprise a metal material.

In accordance with one or more embodiments or any of the method of additive manufacturing embodiments above, the transition material can be a discrete deposit between the embedded electronic and the base material that contemporaneously forms the transition zone.

In accordance with one or more embodiments or any of the method of additive manufacturing embodiments above, the transition material can be a material gradient that starts with transition zone material near the embedded electronics and incrementally includes more of the base material as the transition zone moves away from the embedded electronics and towards the base material.

In accordance with one or more embodiments or any of the method of additive manufacturing embodiments above, the transition zone can comprise a plurality of columns constructed in one or more layers.

In accordance with one or more embodiments or any of the method of additive manufacturing embodiments above, the transition zone can comprise a plurality of stacked wreaths constructed in one or more layers.

In accordance with one or more embodiments or any of the method of additive manufacturing product embodiments above, the transition zone can comprise a plurality of projecting columns constructed in one or more layers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

According to one or more embodiments, energy-based metal additive manufacturing for embedding electronics is provided. In general, energy-based metal additive manufacturing is a three-dimensional object production process utilizing computer design file. In this regard, a variety of materials ranging from polymer composites, metals, ceramics, food, foams, gels, etc. are deposited by a tool or feeder according to the computer design file and heated by an electric beam to set the material in place. The location of the deposited materials as the tool or feeder moves according to the computer design file is referred to as a tool path.

The energy-based metal additive manufacturing described herein includes utilizing a base material, a transition zone material, and the embedded electronics. For example, the embedding electronics are comprised of circuitry and sensors set in an insulation material, the base material is a metal material, and the transition zone material is a material with an intermediate melting point that is lower than a melting point of the base material. The intermediate melting point enables the transition zone material to be compatible with the embedded electronics, as to not burn the circuitry and sensors therein, while also enabling the transition zone material to consolidate or bond with the metal material.

According to one or more embodiments, a transition zone is utilized. The transition zone can be a discrete zone, where the transition zone material is in primary use. A technical effect and benefit the transition zone includes enabling the installing of the embedded electronics in both plastic additively manufactured parts and metal additively manufactured parts. In turn, sensors, heaters, motors, and wireless transmitters can be intimately integrated into additively build hardware, reducing packaging, optimizing performance, and aiding in equipment prognostics.

Figure 1:
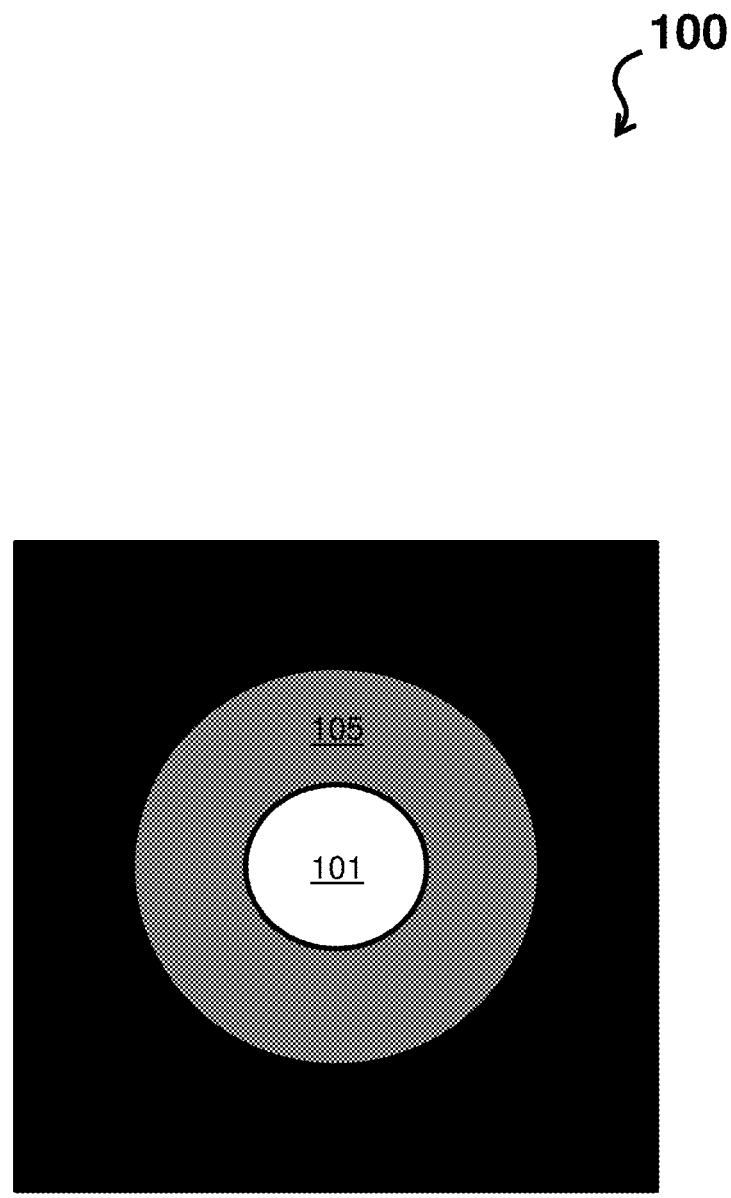
FIG. 1 depicts a product of energy-based metal additive manufacturing according to one or more embodiments.

Turning to FIG. 1, a product 100 of energy-based metal additive manufacturing is depicted according to one or more embodiments. The product 100 includes embedded electronics 101, a transition zone material 105, and a base material 109. As shown in FIG. 1, the transition zone material 105 is contemporaneous with a transition zone of the product 100 (e.g., the transition zone can be a discrete zone, where the transition zone material 105 is in primary use). These features are further illustrated and explained with respect to FIG. 2.

Figure 2:
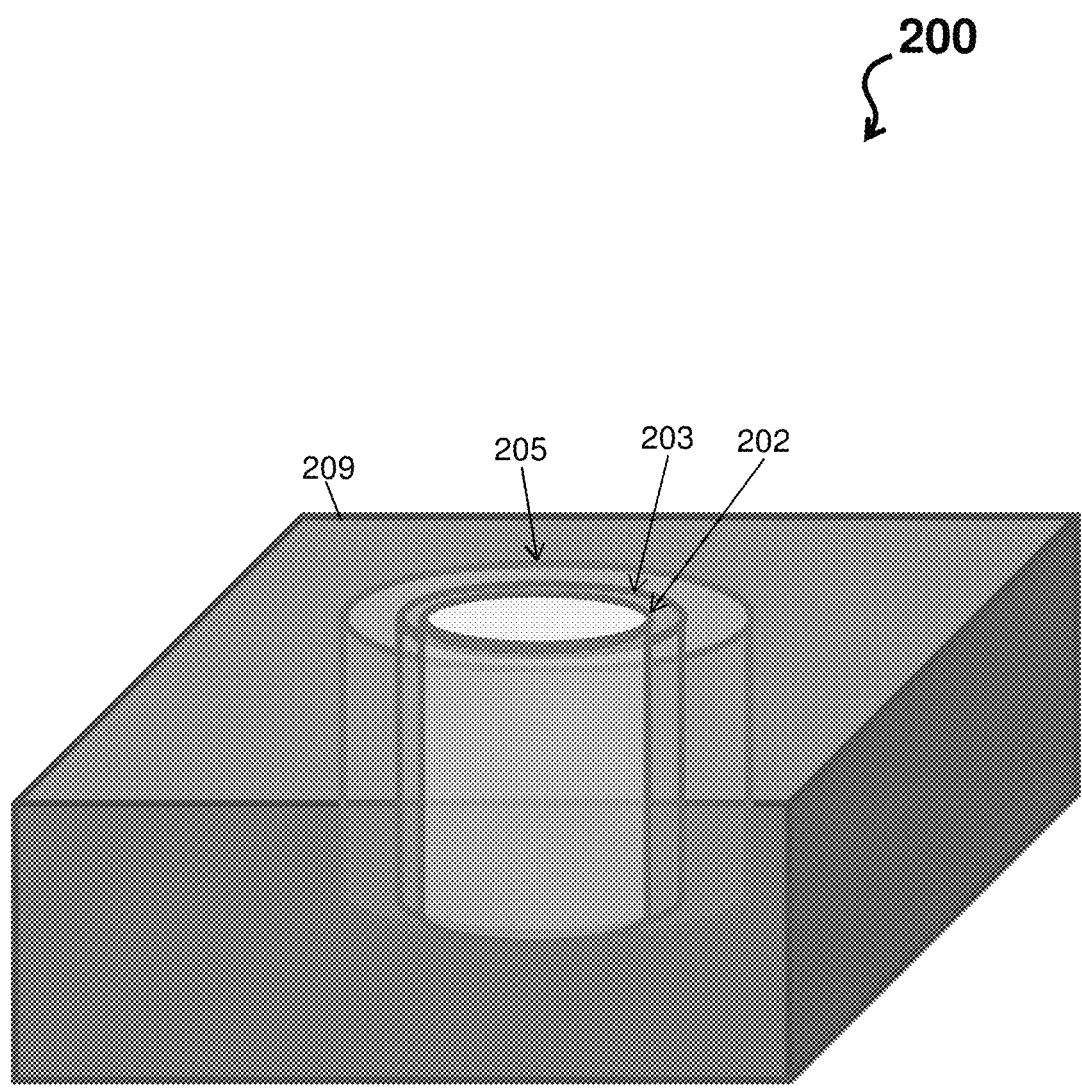
FIG. 2 depicts a product of energy-based metal additive manufacturing according to one or more embodiments.

FIG. 2 depicts a product 200 of energy-based metal additive manufacturing according to one or more embodiments. The product 200 is shown at a perspective view with each component being transparent to show outlines of other components. The product 200 includes a wire 202, an insulation material 203 encasing the wire 202, a transition zone material 205 encasing the insulation material 203, and a base material 209 encasing transition zone material 205. The combination of the wire 202 (e.g., circuitry and/or sensors) and the insulation material 203 can be consider an embedded electronic, such that the wire 202 is set into the insulation material 203.

The transition zone material 205 is contemporaneous with a transition zone of the product 200. The transition zone protects the electronic components (e.g., the wire 202) from the encasing or surrounding high-melting base metal (e.g., the base material 209).

For example, a common electrical insulation (e.g., the insulation material 203) is polyimide which can sustain temperatures up to 650° C. The melting temperature of nickel, a common additive manufacturing metal (e.g., the base material 209), is upwards of 1400° C. Nickel cannot be deposited directly on polyimide without destroying the insulation. Accordingly, embodiments herein utilize with a lower-melting temperature material (e.g., the transition zone material 205) to encase or surround the wire insulation (e.g., the insulation material 203) before applying/depositing the base material 209. (e.g., the transition zone material 205) effectively works as the transition zone. For example, the transition zone material (e.g., the transition zone material 205) can be any metal or alloy containing metals like tin (Tm=232° C.) or aluminum (Tm=660° C.) with a base material (e.g., the base material 209) like nickel (Tm=1453° C.). This lower-melting point material can be on par with a max operational temperature of the wire insulation, as to not damage the wire insulation or electronics therein.

According to one or more embodiments, the transition zone can also be composed of a material gradient, starting with primarily the transition zone material near the embedded electronics and incrementally including more of the base material as the transition zone moves away from the embedded electronics and towards the base material. A technical effect and benefit of the composing the transition zone of the material gradient include ensuring when a high melting temperature base material is applied during energy-based metal additive manufacturing, the transition zone will not flow uncontrollably. These features are further illustrated and explained with respect to FIG. 3.

Figure 3:
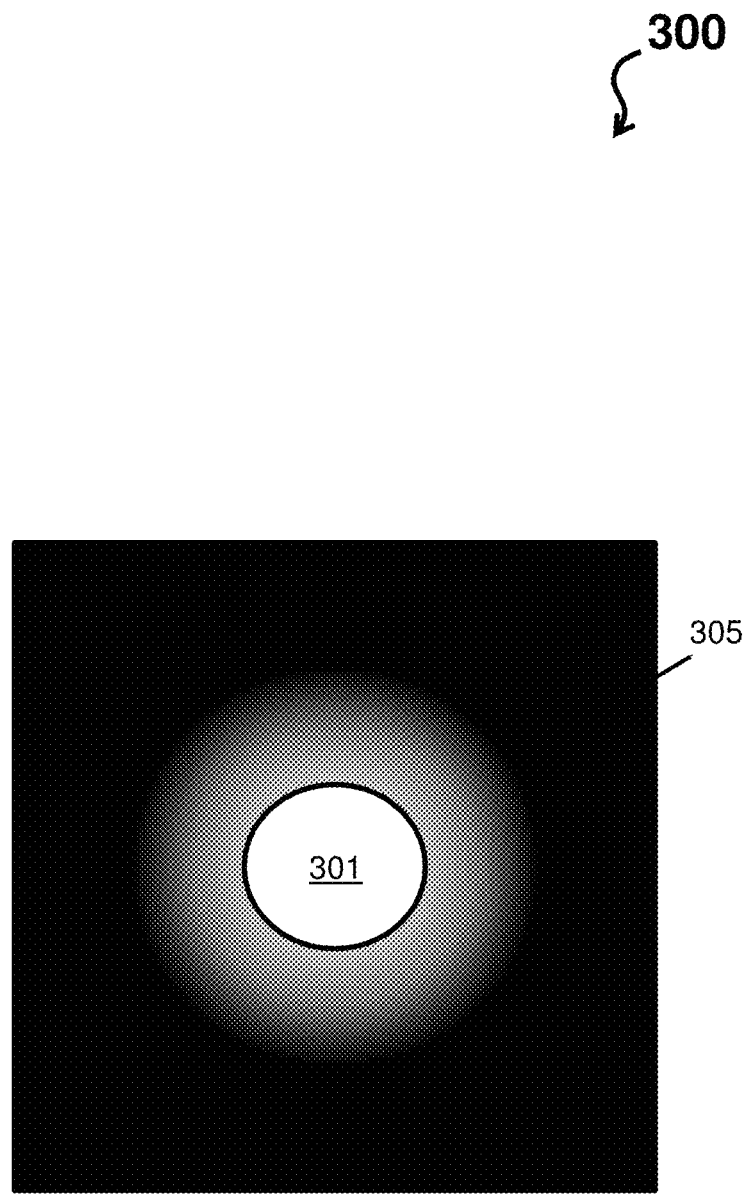
FIG. 3 depicts a product of energy-based metal additive manufacturing according to one or more embodiments.

FIG. 3 depicts a product 300 of energy-based metal additive manufacturing according to one or more embodiments. The product 300 includes embedded electronics 301, a transition zone 305, and a base material 309. The transition zone 305 comprises a material gradient to avoid interface issues between a transition zone material used in the transition zone 305 and the base material 309. For example, the material gradient can comprise starting with a transition zone metal with increasing quantities of a base metal as the transition zone 305 progresses from the embedded electronics 301 to the base material 309. In turn, the meting point of the transition zone 305 gradually increases as the material gradient changes from the transition zone material and the base material 309. At a side of the transition zone 305 that is opposite the embedded electronics 301 where the (pure) base material 309, the melting point of the transition zone 305 is at its highest and the transition zone metal does not flow uncontrollably In view of one or more embodiments herein, toolpaths for tool or feeder constructing the transition zone including a material gradient are described with respect to various techniques including a linear depositing technique, a concentric depositing technique, and a pineapple depositing technique. The linear depositing technique and the concentric depositing technique provide a ring or shell-like approach with discrete toolpaths with decreasing concentrations of transition zone metal.

Figure 4:
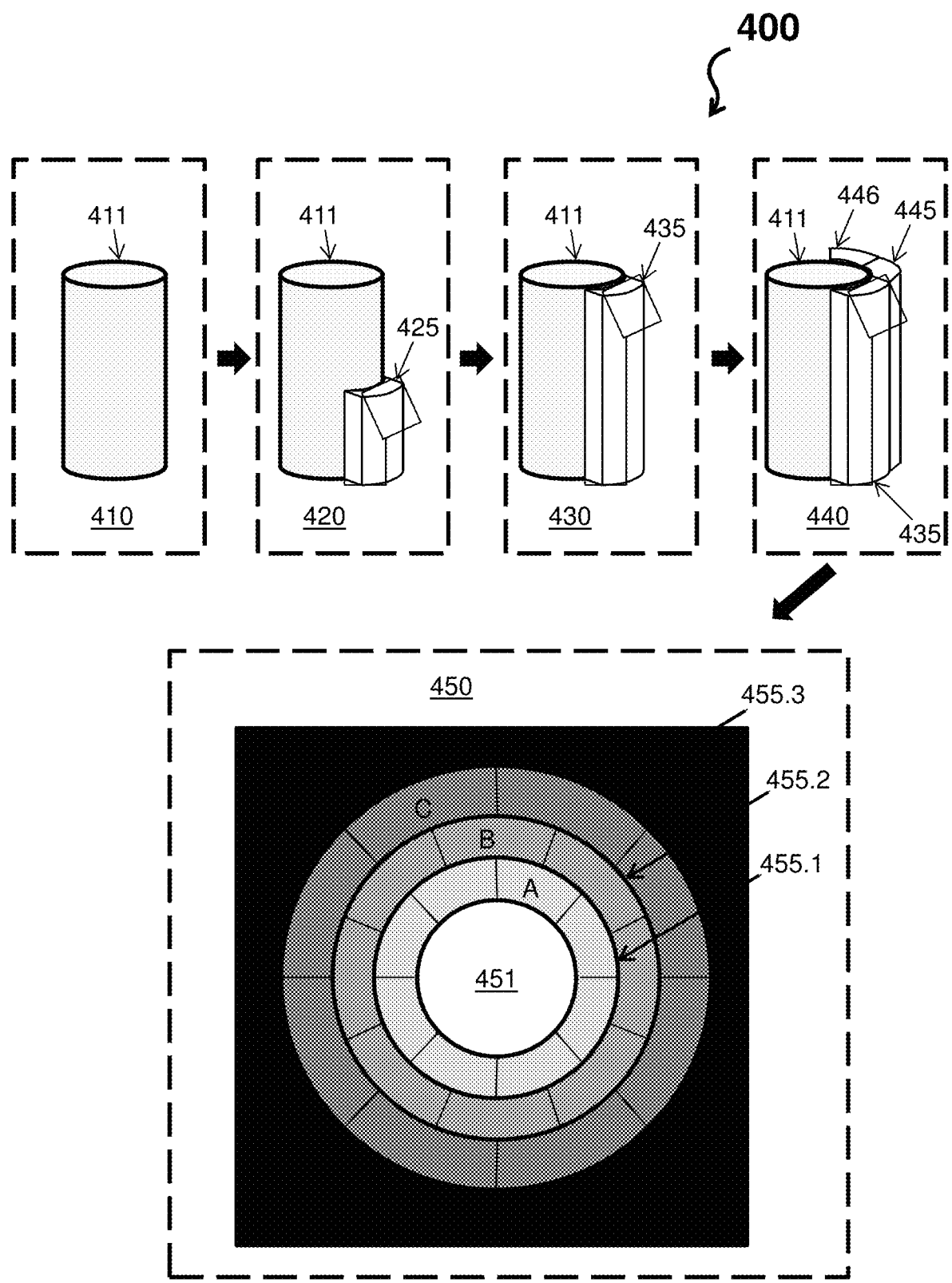
FIG. 4 depicts a schematic flow of energy-based metal additive manufacturing using a linear depositing technique for a transition zone according to one or more embodiments.

Turning now to FIG. 4, a schematic flow 400 of energy-based metal additive manufacturing using a linear depositing technique for a transition zone is depicted according to one or more embodiments. The linear depositing technique comprises repetitive straight toolpaths (along the embedded electronic) to create adjacent columns of material.

The schematic flow 400 begins with a schematic 410 showing an embedded electronic 411 (e.g., a wire encased in an insulation material). The schematic flow 400 then proceeds to schematic 420 where a transition material is in mid-process (425) of being deposited in a linear fashion. Next, at schematic 430, a column 435 of the transition material is completely deposited along the embedded electronic 411. At schematic 440, multiple columns 445, 446 of the transition material have been deposited along the embedded electronic 411. As columns are continuously deposited (moving onto schematic 450), a final product is produced from the linear depositing technique. In this regard, an embedded electronic 451 (previously embedded electronic 411) is encased in a transition zone comprising at least three layers 455.1, 455.2, and 455.3. The transition zone is further encased in a base material 459.

As shown in FIG. 4, an interior layer 455.1 can comprise a plurality of columns constructed of transition material formed from composition A. Composition A can be primarily transition zone material (e.g., 51%-100%), with trace amounts of the base material 459 (e.g., 0%-49%). The intermediate layer 455.2 can comprise a plurality of columns constructed of composition B. Composition B can be a combination of the transition zone material (e.g., 25%-100%) and the base material 459 (e.g., 0%-75%). The outer layer 455.3 can comprise a plurality of columns constructed of composition C. Composition C can be a combination of the transition zone material (e.g., 0%-100%) and the base material 459 (e.g., 0%-100%). Thus, the compilation of the layers 455.1, 455.2, and 455.3 provide the material gradient. Note that while three layers 455.1, 455.2, and 455.3 as shown in FIG. 4, any number of layers may be utilized to produce the material gradient through the transition zone.

Figure 5:
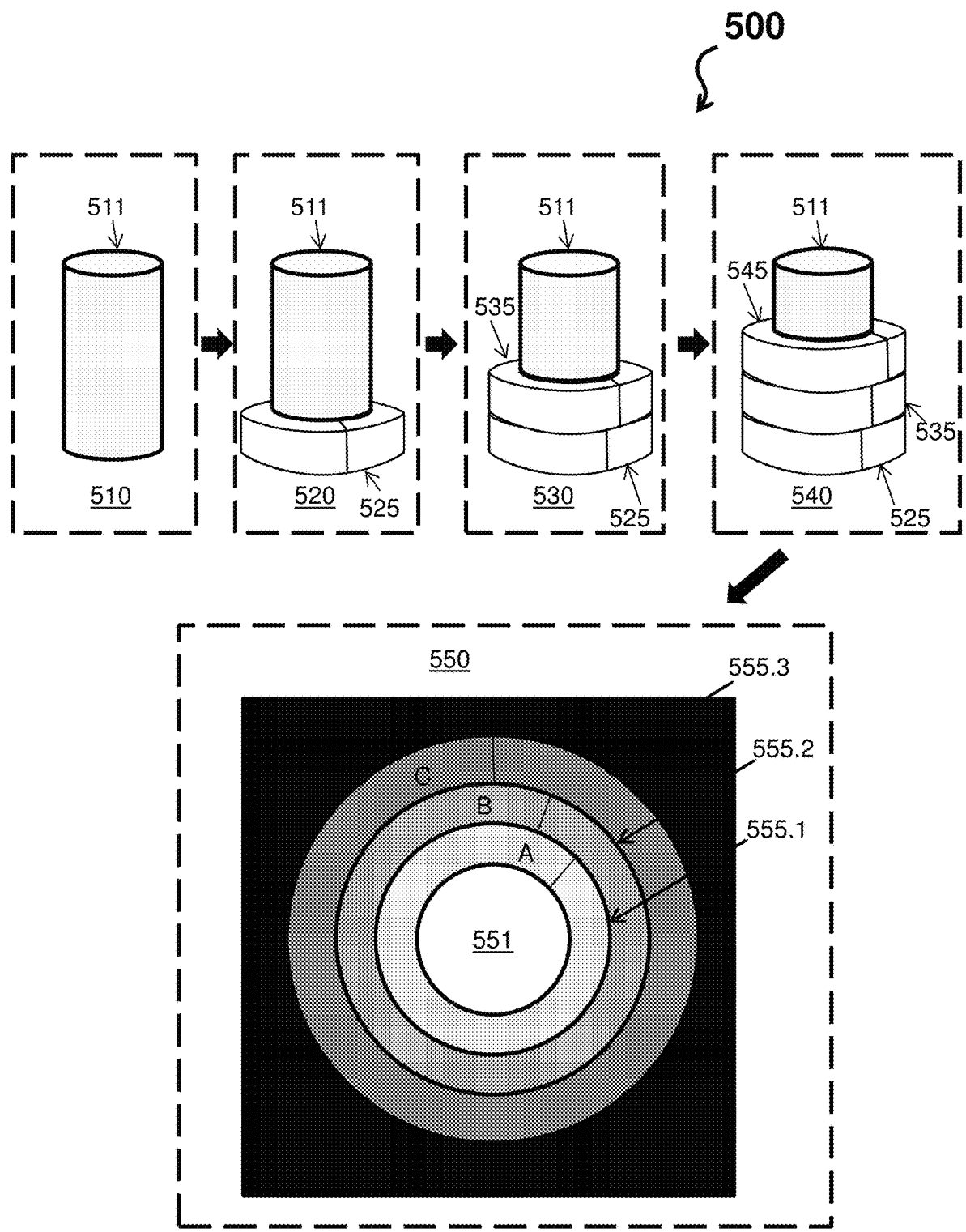
FIG. 5 depicts a schematic flow of energy-based metal additive manufacturing using a concentric depositing technique for a transition zone according to one or more embodiments.

FIG. 5 depicts a schematic flow 500 of energy-based metal additive manufacturing using a concentric depositing technique for a transition zone according to one or more embodiments. The concentric depositing technique comprises repetitive circular toolpaths (around the embedded electronic) to create wreaths of material. Note that each wreath can correspond to a degree of rotation between other wreathes.

The schematic flow 500 begins with a schematic 510 showing an embedded electronic 511 (e.g., a wire encased in an insulation material). The schematic flow 500 then proceeds to schematic 520 where a wreath 525 of transition material is completely deposited around the embedded electronic 511. At schematic 530, a wreath 535 of transition material is completely deposited around the embedded electronic 511. At schematic 540, a wreath 545 of transition material is completely deposited around the embedded electronic 511. As wreaths are continuously deposited (moving onto schematic 550), a final product is produced from the concentric depositing technique. In this regard, an embedded electronic 551 (previously embedded electronic 511) is encased in a transition zone comprising at least three layers 555.1, 555.2, and 555.3. The transition zone is further encased in a base material 559.

As shown in FIG. 5, an interior layer 555.1 can comprise a plurality of stacked wreaths of transition material formed from composition A. Composition A can be primarily transition zone material (e.g., 51%-100%), with trace amounts of the base material 559 (e.g., 0%-49%). The intermediate layer 555.2 can comprise a plurality of stacked wreaths constructed of composition B. Composition B can be a combination of the transition zone material (e.g., 25%-100%) and the base material 559 (e.g., 0%-75%). The outer layer 555.3 can comprise a plurality of stacked wreaths constructed of composition C. Composition C can be a combination of the transition zone material (e.g., 0%-100%) and the base material 559 (e.g., 0%-100%). Thus, the compilation of the layers 555.1, 555.2, and 555.3 provide the material gradient. Note that while three layers 555.1, 555.2, and 555.3 as shown in FIG. 5, any number of layers may be utilized to produce the material gradient through the transition zone.

Figure 6:
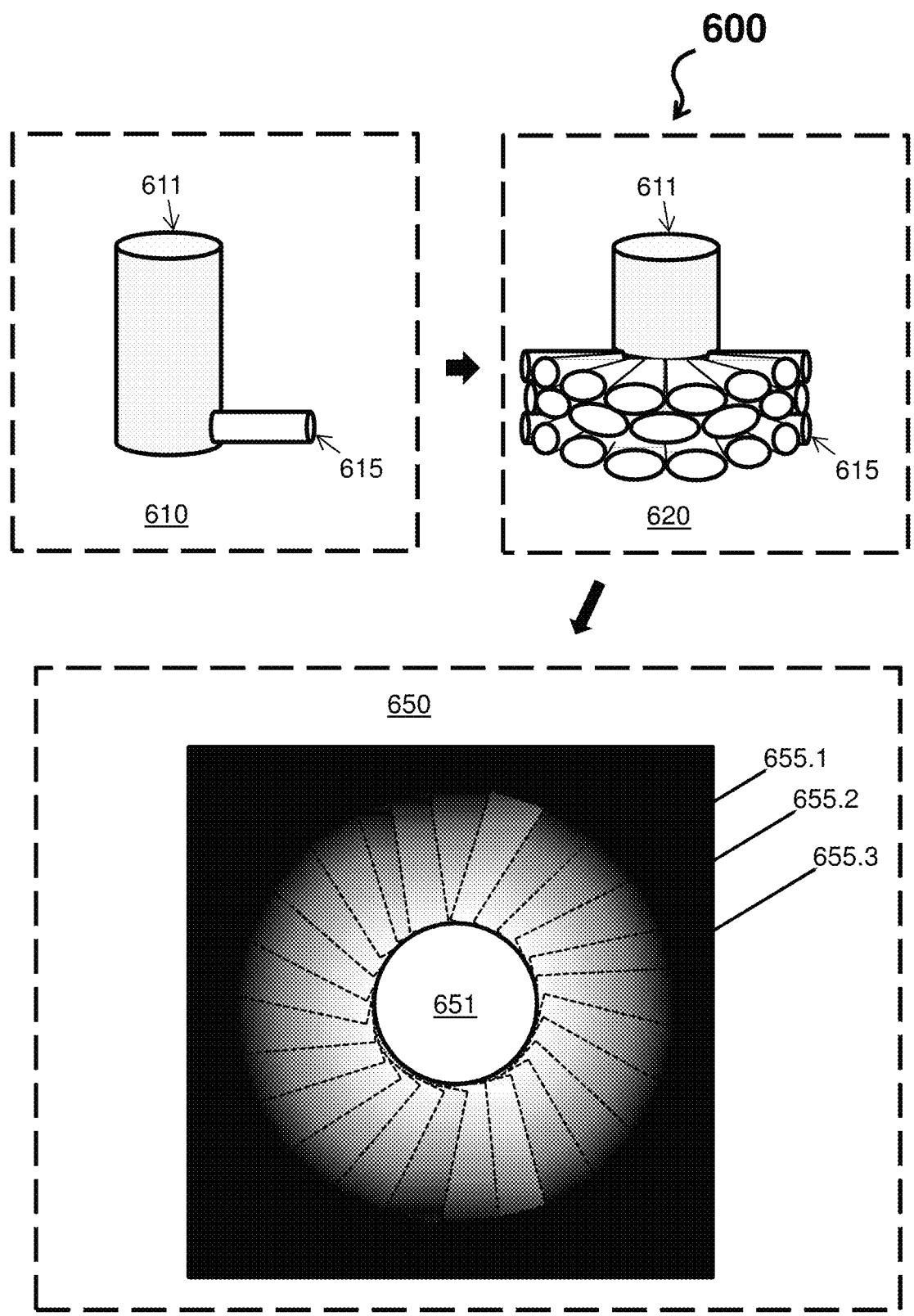
FIG. 6 depicts a schematic flow of energy-based metal additive manufacturing using a pineapple depositing technique for a transition zone according to one or more embodiments.

FIG. 6 depicts a schematic flow 600 of energy-based metal additive manufacturing using a pineapple depositing technique for a transition zone according to one or more embodiments. The pineapple depositing technique comprises repetitive linear toolpaths (extending from the embedded electronic) to create projecting columns of material. The pineapple depositing technique can be considered a true-gradient applied through a radial array of toolpaths normal to the embedded electronics.

The schematic flow 600 begins with a schematic 610 showing an embedded electronic 611 (e.g., a wire encased in an insulation material) and a column 615 of the transition material is completely deposited projecting from the embedded electronic 611. The schematic flow 600 then proceeds to schematic 620 where a plurality of columns are projecting from the embedded electronic 611. Note that each row of columns can correspond to a degree of rotation between other rows as shown in FIG. 6. Moving onto schematic 650), a final product is produced from the pineapple depositing technique. In this regard, an embedded electronic 651 (previously embedded electronic 611) is encased in a transition zone comprising a plurality of gradient projecting columns, for example, columns 655.1, 655.2, and 655.3. The transition zone is further encased in a base material 659.

Each to the plurality of gradient projecting columns is comprised of a transition material. The transition material of each gradient projecting column varies in proportions as the column moves away from the embedded electronic 651. That is, as the tool or feeder moves along the toolpath of a projection column, the amount of the transition zone material decreases, the amount of the base material increases, and the amount of the insulation material decreases.

In accordance with one or more embodiments, the energy-based metal additive manufacturing described herein can also be created using a deposition strategy directionality around a component. For example, such that columns traverse axially along electronic component.

Figure 7:
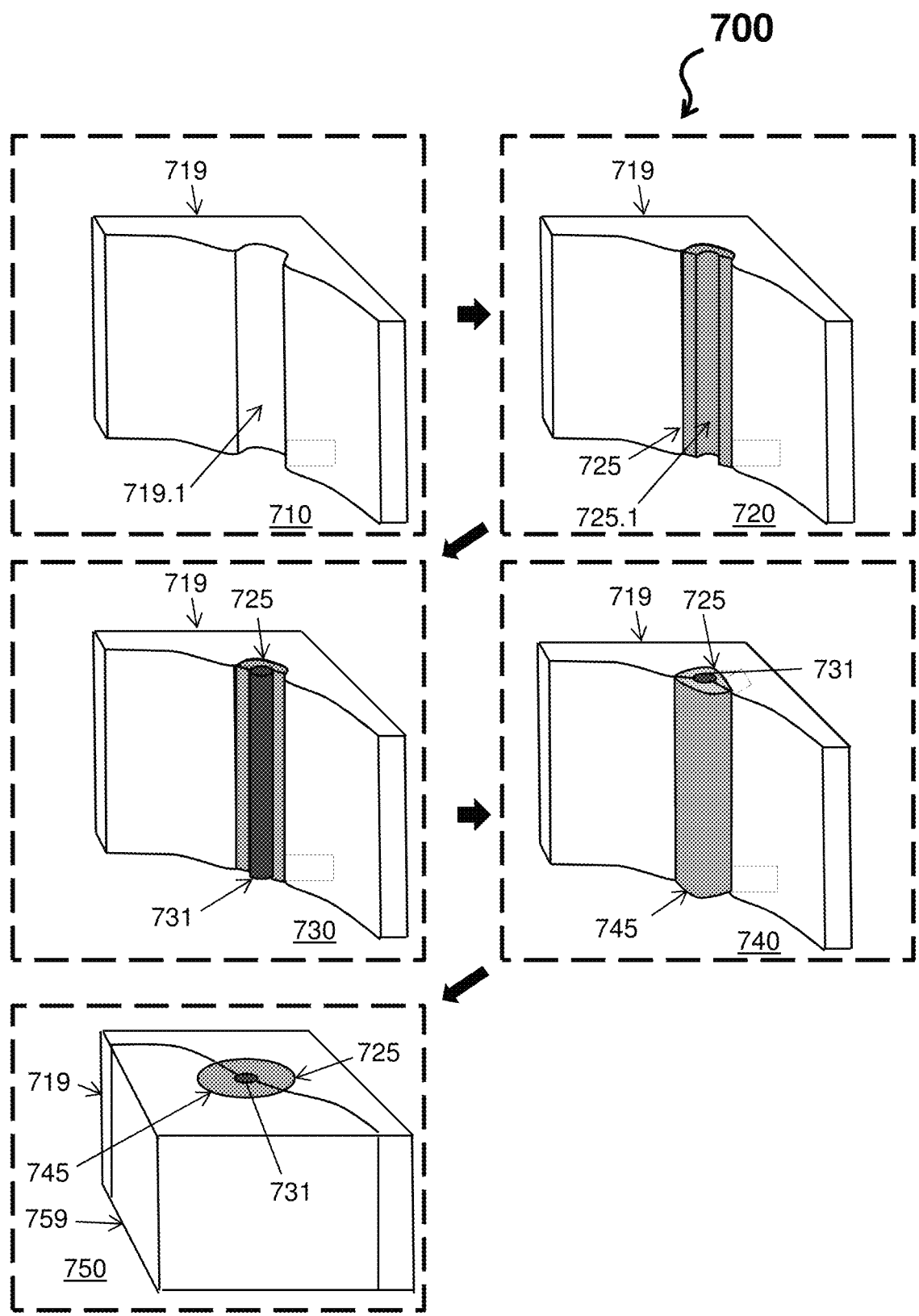
FIG. 7 depicts a schematic flow of energy-based metal additive manufacturing according to one or more embodiments.

FIG. 7 depicts a schematic flow 700 of energy-based metal additive manufacturing according to one or more embodiments. The schematic flow 700 begins with a schematic 710 showing a first portion 719 of a base material constructed. Note that the first portion 719 of the base material comprises a groove 719.1 (e.g., a transition zone cavity). The schematic flow 700 then proceeds to schematic 720 where a first portion 725 of a transition zone is constructed. Note that the first portion 725 of the base material comprises a groove 725.1 (e.g., a wire cavity). The schematic flow 700 then proceeds to schematic 730 where an embedded electronic 731 is deposited or placed within the groove 725.1. Next, at schematic 740, a second portion 745 of the transition zone is constructed (e.g., encasing for wire). Next, at schematic 750, a second portion 759 of the base zone is constructed (e.g., encasing for transition zone). Note that the first and second portions of the transition zone, 725 and 745, can be constructed according to any of the techniques herein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An additive manufacturing product comprising:
an embedded electronic extending from a bottom end to a top end to define a side surface;
a transition zone encasing the embedded electronic, the transition zone comprising a transition material; and
a base material encasing the transition zone;
wherein the transition material comprises an intermediate melting point that is lower than a melting point of the base material,
wherein the transition material directly contacts the side surface and covers the bottom end while completely encasing the side surface such that the base material does not directly contact the embedded electronic.

2. The product of claim 1, wherein the intermediate melting point enables the transition zone material to be compatible with the embedded electronics and enables the transition zone material to bond with the base material.

3. The product of claim 1, wherein the base material comprises a metal material.

4. The product of claim 1, wherein the transition material is a discrete deposit between the embedded electronic and the base material, the transition material completely surrounding the embedded electronic and that contemporaneously forms the transition zone.

5. The product of claim 1, wherein the transition material is a material gradient that starts with transition zone material near the embedded electronics and incrementally includes more of the base material as the transition zone moves away from the embedded electronics and towards the base material.

6. The product of claim 1, wherein the transition zone comprises a plurality of columns constructed in one or more layers.

7. The product of claim 1, wherein the transition zone comprises a plurality of stacked wreaths constructed in one or more layers.

8. The product of claim 1, wherein the transition zone comprises a plurality of projecting columns constructed in one or more layers.

9. The product of claim 1, wherein the transition material extends along the side surface from the bottom end to the top end, and wherein an upper portion of the top end is exposed by the transition material and the base material.

* * * * *